Oct. 7, 1947.  A. M. BLACKFORD, JR  2,428,734
SHEEP CATCHER
Filed Jan. 28, 1946
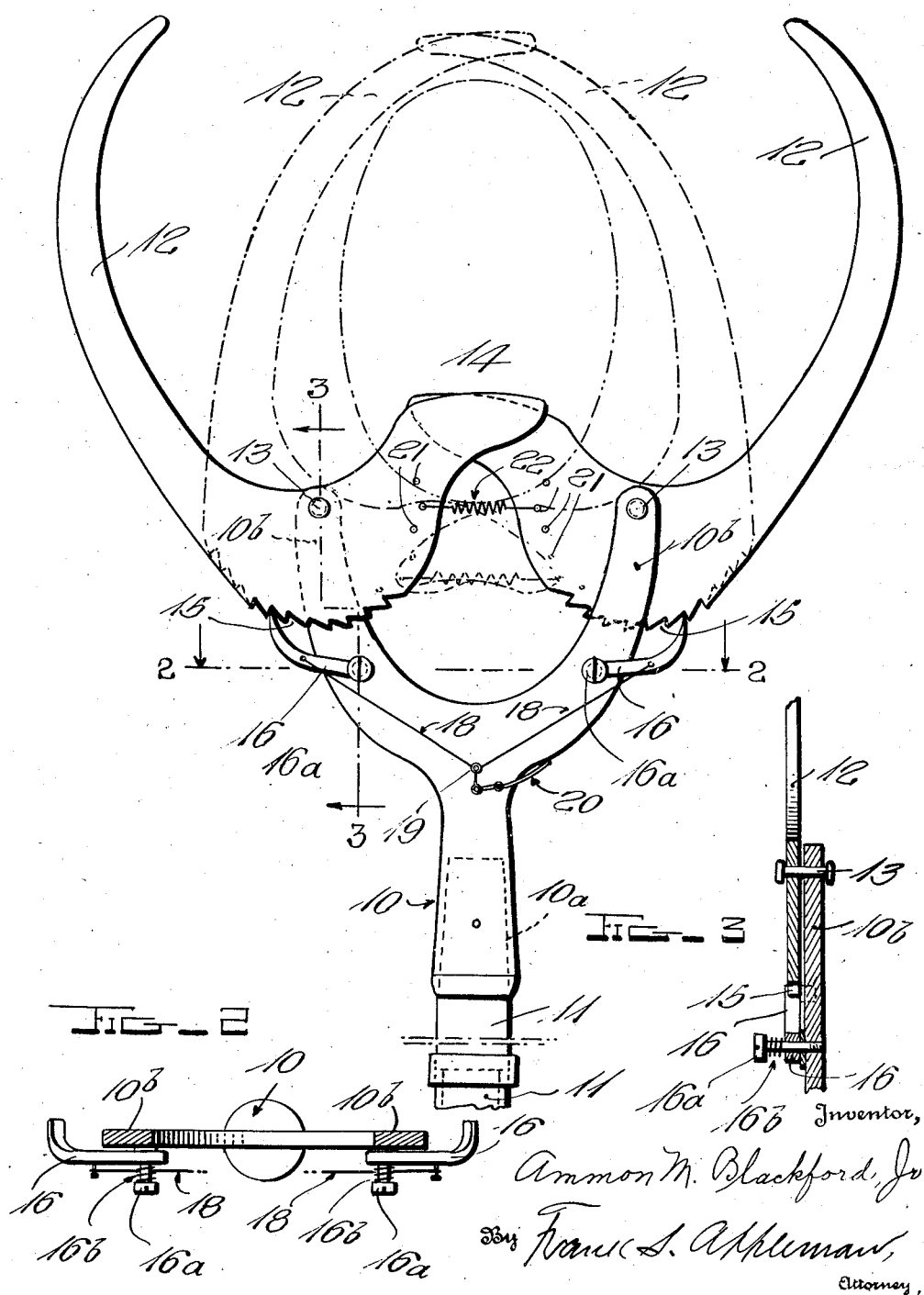

Patented Oct. 7, 1947

2,428,734

UNITED STATES PATENT OFFICE 2,428,734

SHEEP CATCHER

Ammon M. Blackford, Jr., Belle Fourche, S. Dak.

Application January 28, 1946, Serial No. 643,881

6 Claims. (Cl. 119—154)

This invention relates to animal catchers, in which an individual animal is selected for a particular purpose and hobbled or otherwise gripped for the purpose of carrying out the end for which the action is taken. The invention is designed more particularly for the catching of sheep, as for shearing purposes.

It has been the general practice when catching sheep, as well as other animals, to employ a suitable implement which is thrust into the zone of the legs of the animal for the purpose of grasping one or more of the legs and thus secure the animal for the particular service which is to be performed, generally a shearing service or lambing. This practice is not only difficult, but where the implement is passed beneath the animal from the rear, for instance, it enters the zone of the udder of the sheep and may injure the udder. Obviously, the user of the implement and the implement must be sufficiently close to the ground when manipulating the implement as to permit such action, a position which is more or less unnatural and therefore tedious and difficult, unless a group of animals should be herded within a corral and thus have little opportunity to move about, or where the animals pass through a chute or other restricted space, where there is little opportunity for the animal to move about.

While the present invention can be utilized in a practice similar to that indicated, the invention primarily is designed to permit the animal to be gripped by the neck rather than by the foot. With the foot as the gripped member, there is a possibility that the animal in its efforts to escape could become damaged as by the breaking of a leg or the like; by gripping the individual sheep by the neck, this particular danger is avoided through the fact that the part of the animal being gripped is considerably larger and of an entirely different conformation and in a zone where it would be somewhat difficult for the animal to advance or retreat, especially in view of the fact that with the gripping jaws over the neck, any material struggle by the animal could tend to close the windpipe and by this action tend to discourage such attempts.

In addition to these advantages, the implement has the very definite advantage of being able to be used by the operator while either afoot or mounted, as on horseback, in an automobile, etc. Whether afoot or mounted, the implement can be applied from above, or from the side, or even the rear, the trigger zone being so positioned relative to the mouth of the open jaw members as will enable the user by a quick thrust to close the jaws sufficiently to provide the desired gripping action, regardless of the particular point from which the user is presenting the implement.

The dimensions of the implement and the contour of the gripping jaws are so developed as to provide for the gripping action on the neck without, however, affecting the breathing of the animal under normal conditions—should the animal struggle, however, the jaws, then in gripping position, would set up a pressure on the neck such as to affect the windpipe and in this respect tend to discourage struggle by the animal. Where the implement is to be used with the foot of the animal, the dimensions and contours are varied accordingly.

Structurally, the implement is of simple type and thus of comparatively low cost of production, without materially affecting the efficiency of the implement in action.

To these and other ends, the nature of which will be readily understood as the invention is hereinafter disclosed, said invention consists in the improved construction and combination of parts hereinafter more particularly described, illustrated in the accompanying drawings, and more particularly pointed out in the appended claims.

In the accompanying drawings, in which similar reference characters indicate similar parts in each of the views:—

Figure 1 is a view in elevation of the operating end of the implement—the handle being partially broken away—the head being shown in open position in full lines and in closed position in dot and dash lines;

Figures 2 and 3 are sectional views taken on lines 2—2 and 3—3, respectively, of Fig. 1.

In the drawings, 10 indicates the head of the implement which carries the gripping jaws and also provides a seat 10a for one of the members 11 of a sectional handle, the latter being preferably formed of metal tubing such, for instance, as aluminum, and is preferably formed in a number of sections (preferably three) to permit of use afoot or mounted, the sections being assembled in the latter case; in practice, the sections are formed for ready assembly and disassembly in a well known manner—as by having a tenon at one end and a socket at the other—or telescoping one inside the other, this being a common form of structure and not illustrated in detail in the drawings.

The head is also formed with a pair of arms 10b symmetrically disposed with respect to the head axis and forming with the head an approximately U-shaped supporting zone for the gripping jaws 12.

The jaw members 12 are substantial duplicates, being generally similar in contour and dimensions and are mounted in opposed relationship on the arms 10b, each being pivoted to its particular arm at a point intermediate the ends of the jaw members. Due to the location of the pivot—indicated at 13—one end zone of each jaw member is located on the inner side of its arm and has a length sufficient to extend beyond a line corresponding to the head axis; since these zones thus cross each other at such line, the inner ends of the combined zones present a foot-like appearance with the feet oppositely disposed, so that the combined feet produce a trigger zone 14 which crosses the line of such head axis and is symmetrical to such line. The portion of each jaw member lying outside of the pivot 13 is of a desired contour and has a length sufficient to cause the extreme outer ends of the two members to overlap when the members are moved to closed position, with the member length sufficient to receive the neck of the animal, such as a sheep, the inner face of this portion of the jaw member being suitably curved to permit the jaw members to move to closed position without materially affecting the exterior of the neck of the animal.

As is apparent from Figure 1, in which the full line position represents an open position of the jaw members, the two members are symmetrically disposed and have their free ends spaced apart a distance sufficient to permit the user to readily pass the implement over the neck of the animal, the trigger zone 14, then in its full line position, contacting the top of the neck so that continued pressure by the user, causes the trigger to yield and thus rock the jaw members on their pivots to close the jaws at the sides of and beneath the neck, as indicated in dot and dash lines in Fig. 1, the feet of the jaw members passing inwardly within the space between the two arms as the trigger zone recedes under such pressure.

To lock the jaw members in the closed position, each jaw member is formed on its lower surface with an arcuate ratchet tooth zone 15 which is adapted to cooperate with a pivoted pawl 16 carried by the arm on which the jaw member is mounted. As indicated in Fig. 2, the pawl 16 is preferably pivoted at 16a and the spring 16b tends to hold the pawl yieldingly in contact with the tooth zone 15; hence, as the trigger zone moves inwardly under the pressure exerted by the user of the implement and the resistance of the neck of the animal, the pawl rides over the faces of the successive teeth of the tooth zone, and latches one of the teeth when the user ends his pressure on the trigger zone, thus preventing the jaw members from opening and retaining the animal gripped by the implement.

A suitable releasing structure connected to the respective pawls and having an operating handle readily accessible to the user, will serve to release the pawls and permit the jaw members to return to their normal open positions. A simple form of such releasing means is shown in Fig. 1, in which each cord 18 of a pair has one end secured to a pawl 16 and the opposite end connected to a connection 19 which, in turn, is connected to a pivoted operating lever 20 carried by the head 10. When the lever is moved on its pivot to draw on cords 18, both pawls will be released from the tooth engagement and thus free the jaw members.

One of the features of the present invention is the ability to vary the width of the opening between the outer ends of the jaw members, thus enabling the implement to be used under varying conditions. For instance, where it is being used with older age animals, in which the necks are normally larger, the space between the jaw member ends should be larger than where animals such as lambs are being gripped. The distance between such ends of the jaw members should be sufficient to permit the user to readily pass the implement over the neck of the animal, but if such distance is materially excessive, the trigger zone would need to travel some distance before the ends of the members reach a restraining point, so that in such case, an alarmed animal could materially affect the gripping operation, due to the delay in closing of the jaw members. By varying the normal distance, it is possible to provide for quickly bringing the ends of the jaw members into a position where the animal is subject to some restraint by a comparatively small length of movement of the trigger zone.

To permit of this result being attained, each of the jaw members is provided on the inner zone of the member with several openings 21, spaced apart and substantially equally distant from pivot 13, corresponding openings 21 of the two jaw members being opposite each other, and being designed to be connected yieldingly by a spring 22 which has its ends mounted within corresponding openings 21. In Fig. 1 the spring is shown as mounted in the middle openings, the position of the openings in this figure being on a line which would pass through both pivots 13; the spring in this position thus being on the shortest distance between these two points, and therefore having its least tension value. As will be obvious, pressure on the trigger zone will rock the jaw members, and thus swing the spring ends in arcs about the respective pivots and thereby increase the tension of the spring; in other words, any movement of the jaw members from this inactive position of the spring will tend to increase the spring tension, the value of the latter being dependent upon the extent of throw of the jaw members.

When it is desired to lessen the distance between the outer ends of the jaw members, the spring is shifted to the upper pair of openings 21 in Fig. 1, thus bringing these openings onto such line between the pivots 13; and when it is desired to increase the distance between such outer ends of the jaw members, the spring is shifted to the lower openings 21, it being understood that with each shift in position of the spring, the normal position of the trigger zone also changes.

In practice, if the operator is afoot, he would probably use but one of the handle sections; if he is mounted, other sections would be added sufficient to give the length of handle required to readily reach the neck zone of the animal. In either case, the jaw members would be in the full line inactive position of Fig. 1, being held thereby by the spring 22. When the operator is sufficiently close to the neck zone of the animal, he thrusts the implement, thus placing the free ends of the jaw members at the sides of the animal neck, continuing this until the trigger zone is reached, whereupon further advance of the implement causes the trigger zone to recede and thus throw the outer ends of the jaw members into position beneath the neck of the animal, the pawls 16 riding over the ratchet tooth faces as the jaw members move and engaging individual teeth of the ratchet tooth zone when the operator ends the advance and thus locking the jaw members in the closed position, in which position they will be retained until the pawls are released by manipulation of the lever 20, at which time the tensioned spring 22 will act to withdraw the jaw members to the normal inactive position, the operator holding the pawls inactive during this period.

The advantages of this structure not only flow from the fact that the neck of the animal is being engaged rather than a foot of such animal, but from the fact that the jaw members are of symmetrical structure and contour and in each of their positions extend symmetrically with respect to the line of the implement axis. As a result, the throat between the free ends of the jaw members—and which is in open position excepting when the implement is actually being used—is in direct line with the line in which the pressure is being exerted by the user so that the user is better able to direct the implement to the desired zone and without likelihood of having the jaw members strike and alarm the animal before the implement can reach the trigger-active position to close the jaw members.

In addition, the structure is exceedingly simple and of few parts, being so formed as to be comparatively light in weight and hence more easily manipulated when the longer length handle form is being employed, enabling more accurate direction of the implement in service.

As is apparent, the spring 22 need not be of high tension value, thus enabling the trigger zone to operate with a developing tension increase but at a comparatively small increasing rate. Since the spring is under its increased tension position at the time the pawls are released, sufficient power will be present to quickly shift the jaws to their open position as the spring tends to resume its lower tensioned value and thus shifts the jaw members on their pivots until the spring reaches its normal position as shown in Fig. 1.

While the implement thus described is particularly adapted for use in gripping the animal by the neck, it is apparent that if there would be a change in the particular contour and dimensions of the outer zone of the jaw members together with other minor changes, the implement can be employed to grasp a leg of the animal, and such variation is contemplated within the invention.

While I have herein shown and described a particular and preferred form of the invention and pointed out ways in which it is designed to be used, it will be readily understood that changes or modifications therein may be found desirable or essential in meeting the exigencies of use or the individual desires of the user and I therefore reserve the right to make any and all such changes as may be found desirable or essential, insofar as the same may fall within the spirit and scope of the invention as expressed in the accompanying claims, when broadly construed.

I claim:

1. A sheep-catching implement comprising a jaw-carrying head having a handle, said head including a pair of arms symmetrically disposed relative to the head axis to thereby present a head of general U-shape formation, a jaw member individual to and pivotally carried by each arm, said jaw members being generally similar in contour and dimensions and mounted in opposed relation with the pivot point of a member spaced from the opposite ends of the jaw member to thereby locate the inner end of the member between the opposite pivot points of the arms with such inner end having a length to extend beyond the head axis to thereby cause the inner ends of the two members to form a trigger zone symmetrical to the head axis, the outer portion of the member presenting a zone such that when the two members are concurrently swung pivotally in opposite directions toward each other, such zones will form an animal-gripping zone with the trigger zone active to provide the swinging movement through trigger contact with the animal, a spring connecting the inner portions of the members and operative to swing the outer portions of the members to open position, a pair of ratchet members carried by the head and cooperative respectively with a segmental tooth-like face carried by each jaw member to thereby automatically latch the jaw members in a desired closed and animal-gripping position, and releasing means operative at will for releasing the ratchet members and permitting the spring to swing the jaw members to open position.

2. An implement as in claim 1, characterized in that the contour of the jaw members and the dimensions of the implement are such that the animal-gripping zone of the closed members will be dimensioned to receive the neck zone of the animal without animal damage, whereby the implement may be made active while the operator is afoot or mounted for travel.

3. An implement as in claim 1, characterized in that the spring is substantially symmetrical to the head axis with each of the jaw members having a plurality of spaced apart spring-receiving openings to permit variation in the dimensions of the gripping zone of the members in open position.

4. An implement as in claim 1, characterized in that the ratcheting members are spring-supported to thereby cause ratcheting action in presence of jaw member movement under pressure applied to the members through activity of the trigger zone, the releasing means being manually operative and concurrently active on both ratchet members.

5. An implement as in claim 1, characterized in that the trigger zone and the gripping zones of the jaw members are located in advance of the arms of the head during inactivity of the implement with the gripping face of each jaw member having a length and contour such as to overlie material portions of the animal zone to be gripped before trigger zone activity begins during the animal-gripping operation.

6. An implement as in claim 1, characterized in that the jaw members are dimensioned and contoured to receive the neck zone of the animal without animal damage, the handle of the implement being of sectional type to thereby permit implement service by the user either afoot or mounted at will.

AMMON M. BLACKFORD, Jr.